(12) United States Patent  
Martin

(10) Patent No.: US 8,132,688 B2
(45) Date of Patent: Mar. 13, 2012

(54) METHOD AND APPARATUS FOR SOAKING AND DRAINING WOOD CHIPS OR CHUNKS

(76) Inventor: John C. Martin, Birmingham, MI (US)

( * ) Notice: Subject to any disclaimer, the term of this patent is extended or adjusted under 35 U.S.C. 154(b) by 986 days.

(21) Appl. No.: 12/111,737

(22) Filed: Apr. 29, 2008

(65) Prior Publication Data

US 2008/0223224 A1 Sep. 18, 2008

Related U.S. Application Data

(63) Continuation-in-part of application No. 10/829,542, filed on Apr. 22, 2004, now abandoned.

(60) Provisional application No. 60/552,476, filed on Mar. 12, 2004, provisional application No. 60/531,488, filed on Dec. 19, 2003, provisional application No. 60/529,426, filed on Dec. 12, 2003, provisional application No. 60/482,381, filed on Jun. 25, 2003, provisional application No. 60/466,023, filed on Apr. 25, 2003.

(51) Int. Cl.
*B65D 41/04* (2006.01)
*B65D 25/04* (2006.01)
*B65D 85/00* (2006.01)

(52) U.S. Cl. ........................ 220/288; 220/529

(58) Field of Classification Search .................. 220/288, 220/293, 529, 554, 578, 676; 215/231, 357; 99/646 C, 646 LS
See application file for complete search history.

(56) References Cited

U.S. PATENT DOCUMENTS

| | | | |
|---|---|---|---|
| 685,736 A | 11/1901 | Atwell | |
| 750,632 A | 1/1904 | Fisher | |
| 1,948,353 A | 2/1934 | Lagorio | |
| 2,135,503 A * | 11/1938 | Guntrip | 206/205 |
| 2,539,412 A | 1/1951 | Faris | |
| 5,992,673 A | 11/1999 | Hwang | |
| 6,056,143 A | 5/2000 | Stolzman | |

* cited by examiner

*Primary Examiner* — Harry Grosso
(74) *Attorney, Agent, or Firm* — Howard & Howard Attorneys PLLC

(57) ABSTRACT

An apparatus for soaking wood chips or chunks in a liquid and draining the liquid from the wood chips or chunks includes at least a container and a lid. The container includes a sidewall and a bottom surface. The bottom surface and at least a portion of the sidewall are contiguous for containing a liquid therein and for holding the wood chips or chunks within the liquid. The lid has at least one aperture and may be removably coupled to the container. The method places the wood chips or chunks into the apparatus, places all or part of the apparatus into a soaking medium or otherwise fills the apparatus with a soaking medium, soaks the wood chips or chunks, drains the soaking medium from the apparatus, and then positions the wood chips or chunks in a useful position for cooking either with further manipulation or by placement of the entire apparatus in the cooking area.

13 Claims, 9 Drawing Sheets

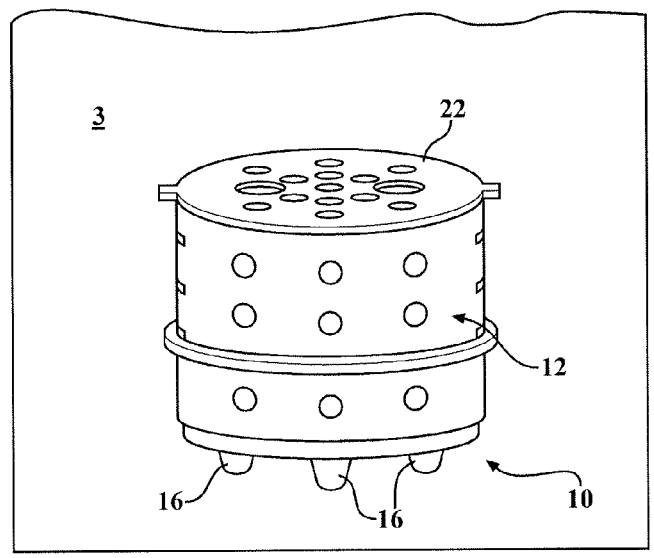
Figure 2A
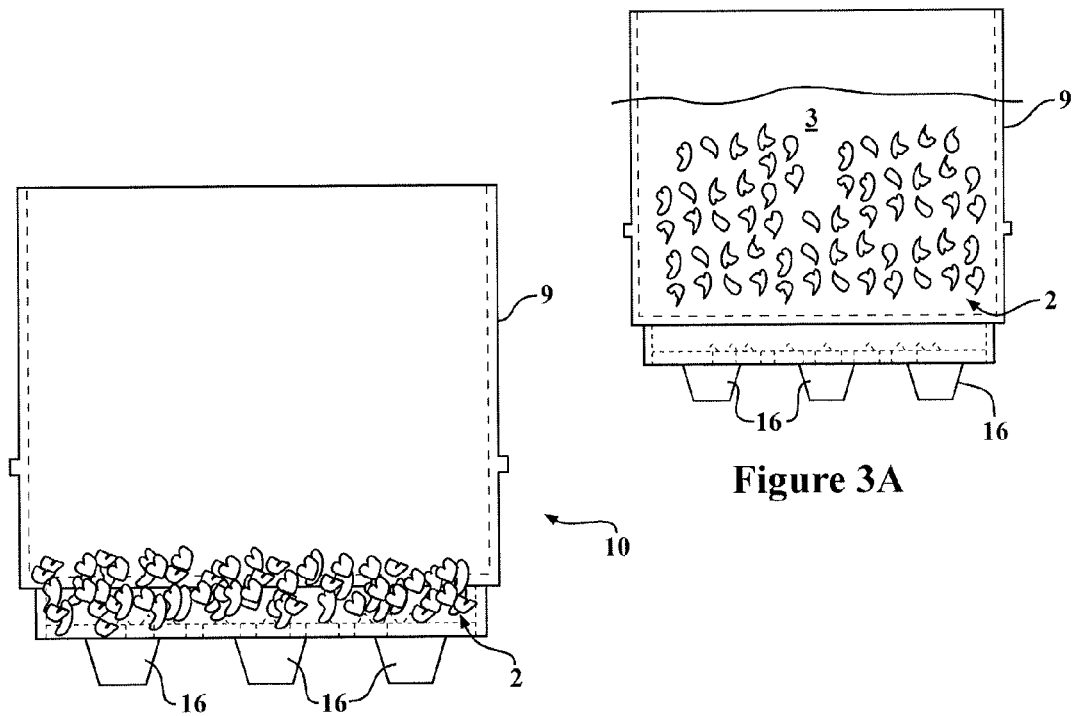
Figure 3A
Figure 3B

METHOD AND APPARATUS FOR SOAKING AND DRAINING WOOD CHIPS OR CHUNKS

This application claims priority as a continuation-in-part to U.S. patent application Ser. No. 10/829,542 filed on Apr. 22, 2004, which claims priority to U.S. Provisional Application Ser. No. 60/552,476, filed Mar. 12, 2004; U.S. Provisional Application Ser. No. 60/531,488, filed Dec. 19, 2003; U.S. Provisional Application Ser. No. 60/529,426, filed Dec. 12, 2003; U.S. Provisional Application Ser. No. 60/482,381, filed Jun. 25, 2003; and U.S. Provisional Application Ser. No. 60/466,023, filed Apr. 25, 2003.

FIELD OF THE INVENTION

The subject invention relates to outdoor grilling accessories, more specifically, to containers used for outdoor grilling applications.

BACKGROUND OF THE INVENTION

In 2001, approximately 13,000,000 lbs. of wood chips or chunks were shipped and sold in the U.S. to be used in smokers and grills (both charcoal and gas) for adding flavor to foods. Of this very sizeable number, many of these wood chips or chunks were soaked in water (or wine, beer, etc.) and drained prior to use in the smokers or grills. This soaking, and subsequent draining, is preferred so that the wood chips or chunks won't burn up too fast but will linger in a smoke-producing state long enough to provide the desired smoke flavor in the foods.

The current method used to soak and drain the wood chips or chunks is to put the required amount of wood chips or chunks into a container, let them soak for a sufficient amount of time, and strain the wood chips or chunks out of the container. The straining is usually done by hand, as is a shaking off of excess water and a subsequent distribution of the wood chips or chunks onto a charcoal fire in the smoker or grill. This is a very tedious process and is done handful by handful of wood chips or chunks. The process works but is messy, it doesn't uniformly soak or drain the wood chips or chunks, and it has limitations when an appropriate container is not readily available.

SUMMARY OF THE INVENTION

The container for soaking and draining wood chips or chunks of the subject invention is designed specifically to facilitate the soaking, draining and subsequent distribution of wood chips or chunks onto a smoker or grill for imparting a rich, smoky flavor to food. The apparatus eliminates a mess of loose wood chips or chunks in a container, a lack of uniform soaking due to a natural buoyancy of the wood chips or chunks, a difficulty in effectively straining and draining the wood chips or chunks prior to placing the wood chips or chunks on the smoker or grill, and the tedious handful by handful process of adding the wood chips or chunks onto the smoker or grill.

The container is designed to be easy to use and effective in soaking, draining, and allowing for the distribution of the wood chips or chunks onto the smoker or grill. One advantage is that the container is easy to fill with wood chips or chunks. Another advantage is that the container has a top for preventing the wood chips or chunks from floating to the surface when the wood chips or chunks are submerged in the soaking fluid, and, after soaking, can effectively strain or drain the excess fluid from the wood chips without removal of the lid.

In one embodiment, an additional advantage is that the container has negative buoyancy that overcomes the buoyancy of the wood chips or chunks to completely submerge the container in water, thereby insuring uniform soaking of the wood chips or chunks. Another advantage of that embodiment can be that the container has standoff legs so that it can be set on a surface and effectively drain without agitation.

Another advantage in various embodiments is that upon removal of a top of the container from the container, the container can be used to readily shake the drained wood chips or chunks onto the smoker or grill.

In another aspect of the present invention, an apparatus for soaking wood chips or chunks in a liquid and draining the liquid from the wood chips or chunks includes a container and a lid. The container includes a cylindrical sidewall (or series of flat sidewalls) and a bottom surface. The bottom surface and at least a portion of the sidewall is contiguous for containing a fluid, preferable a liquid, therein and for holding the wood chips or chunks within the fluid. The lid has at least one aperture and is removably coupled to the container or coupled to the container to be attached to the container in one position to hold the wood chips or chunks within the container and in a second position to allow the wood chips or chunks to be removed from the container.

Using this embodiment, a method for soaking and draining wood chips or chunks would include the steps of placing the wood chips or chunks in a container, placing a lid on the container at a position relative to a level of wood chips or chunks in the container to hold the wood chips or chunks within the container, and immersing the wood chips or chunks in a liquid by pouring the liquid into the container. The liquid may be added in some embodiments after the lid is secured due to fluid passageways disposed in the lid. The method further includes the steps of soaking the wood chips or chunks in the liquid for a period of time and subsequently draining the liquid from the wood chips or chunks that has not been absorbed by the wood chips or chunks.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2A is a view of the wood chip container of FIG. 2 disposed in a river or other body of water;

FIG. 3A is a cross-section view of the wood chip container for soaking and draining wood chips or chunks, disposed in water;

FIG. 3B is a cross-section view of the wood chip container for soaking and draining wood chips or chunks, removed from water;

DETAILED DESCRIPTION AND SPECIFICATION OF THE INVENTIONS

Figure 1:
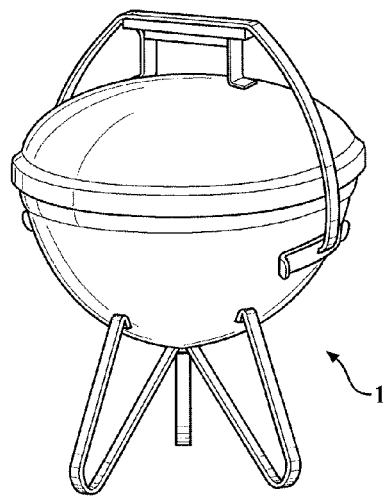
FIG. 1 is an elevated side view of a typical outdoor grill with which the wood chips or chunks can be used.
Figure 2:
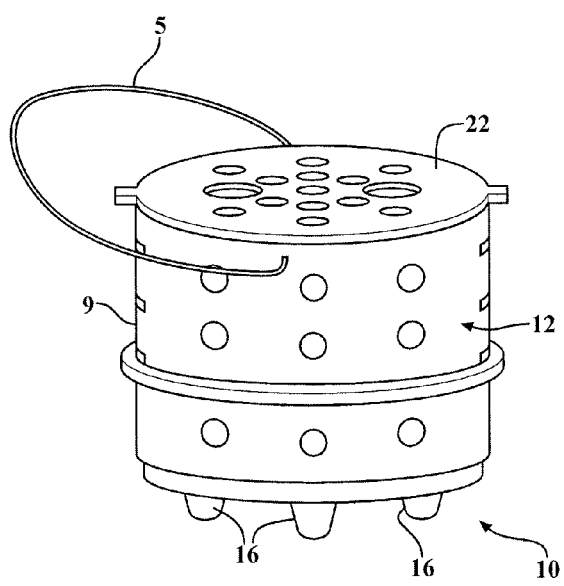
FIG. 2 is a view of a wood chip container containing wood chips or chunks.
Figure 3:
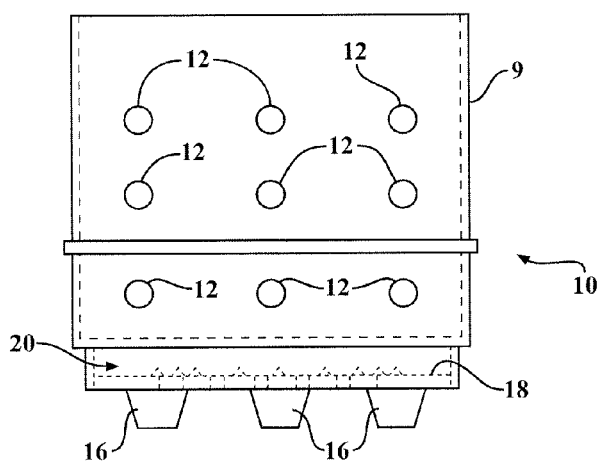
FIG. 3 is a side view of the wood chip container for soaking and draining wood chips or chunks.
Figure 4:
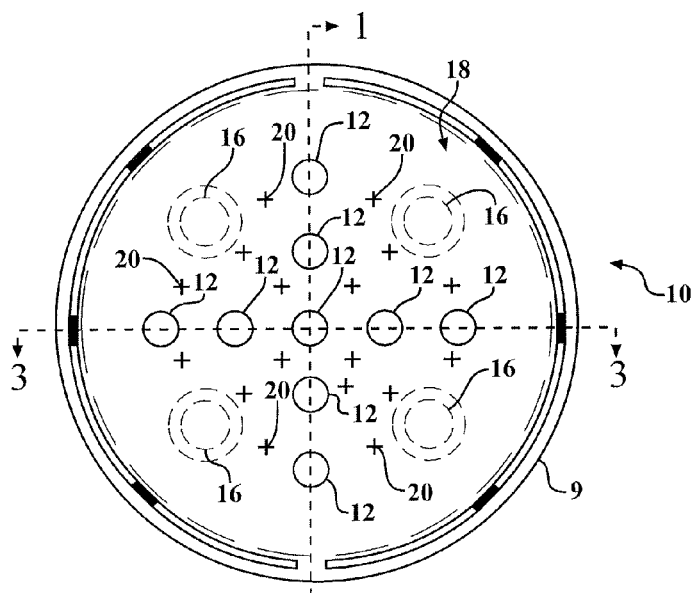
FIG. 4 is a top view of the container.
Figure 5:
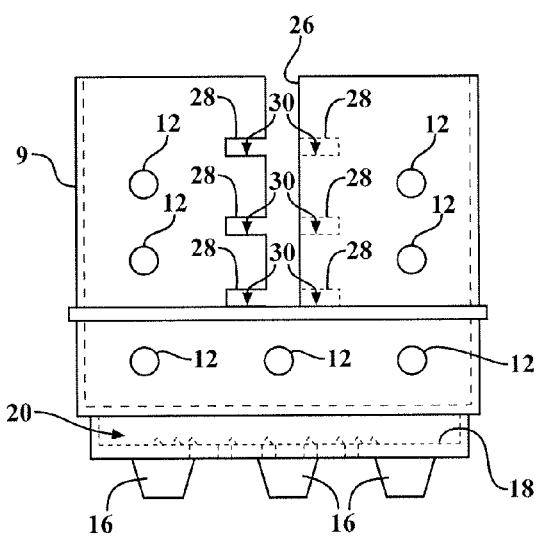
FIG. 5 is a second side view of the container.
Figure 9:
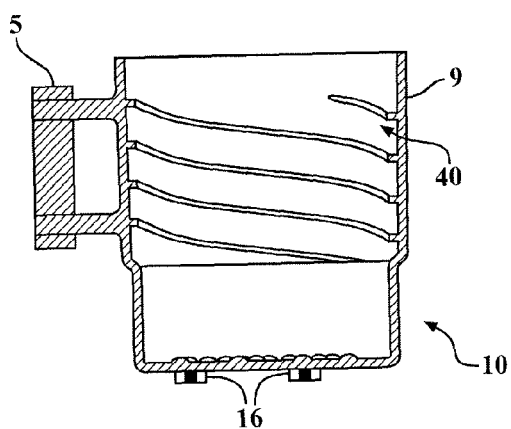
FIG. 9 is a side vertical sectional view of yet another embodiment of the container having threads for securing the lid thereto.
Figure 10:
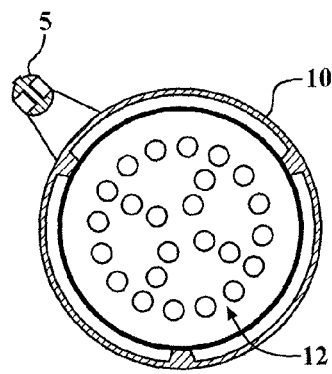
FIG. 10 is a top view of the container shown in FIG. 9.

Referring to the Figures, wherein like numerals indicate like or corresponding parts throughout the several views, a container for soaking and draining wood chips or chunks is shown at 10 in FIGS. 1 through 6. A grill 1 is shown in FIG. 1 which is intended to represent the typical outdoor charcoal grill including a grate (also known as a cooking grate) or similar mechanism to hold the food over a bed of coals that can be ignited or may already be burning. Wood chips or chunks, after being soaked, would be disposed over the ignited coals, in the typical case. Wood chips or chunks that are to be used on a gas grill, after soaking and draining, would be placed in a "smoker box" that would then be placed over a burner element on the gas grill and/or onto the grill The container 10 retains wood chips or chunks 2 such that when the container 10 is immersed in a body of water 3, the negative buoyancy of the lid 22 and container 10 sinks both the lid 22 and container 10 as well as the wood chips or chunks 2 below the surface of the water 3. Over time, this action will soak the wood chips or chunks 2 to make the wood chips or chunks 2 appropriate for use in converting the grill 1 into a smoker. The time period involved is generally in excess of thirty minutes. The vessel is then removed from the water via a handle 5 and allowed to drain for usually in excess of five minutes (FIG. 3B). The handle 5 may be a rope, a wire, or a similar elongated material. The handle 5 may also maintain the lid 22 of the container 10 in close proximity with the container 10 while not reducing the effectiveness of the container 10. Alternatively, the handle 5 may be integral with the container shown in FIGS. 7 and 9.

Preferably, the container 10 is cylindrical in shape and has a sidewall 9. Alternatively, the container 10 may be square or any other shape that would allow for the wood chips or chunks 2 to be held within the container 10. The container 10 and lid 22 have negative buoyancy for totally submersing the container 10 when filled with the wood chips or chunks 2. In one embodiment, the container 10 provides a number of holes or apertures 12 for allowing water into the container 10 upon submersion in water. The holes 12 further allow the water to drain from the container 10 when the container 10 is removed from the water. The container 10 may also include a number of legs 16 to facilitate self-draining of the container 10. A bottom surface 18 inside the container 10 includes a number of projections 20 for facilitating draining of water through the holes 12 in the container 10.

Figure 6:
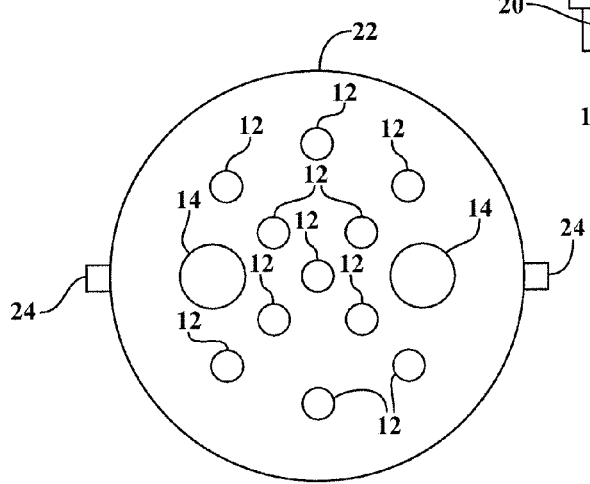
FIG. 6 is a top view of a lid for the container.

As shown in FIG. 6, a lid 22 of the container 10 may also contain holes 12 for allowing the water to flow into the container 10 and to prevent air from being trapped in the container 10 when the container 10 and lid 22 are submersed, which would decrease the negative buoyancy of the container 10 and lid 22 combination. The lid 22 may contain a set of larger holes 14 for allowing the water to flow into the container 10. The lid 22 has a shape that corresponds to the shape of the container 10. The lid 22 includes a pair of tabs 24 extending from opposite sides of the lid 22 for securing the lid 22 to the container 10.

In one embodiment, the container 10 defines vertical grooves 26 on opposite sides of the container 10 that correspond to the tabs 24 on the lid 22. The container 10 further defines a series of horizontal grooves 28 extending into the vertical grooves 26. A detent 30 is disposed in each horizontal groove 28. The lid 22 is inserted onto the container 10 by lining up the tabs 24 with the vertical grooves 26 and sliding the tabs 24 through the vertical grooves 26. The lid 22 is locked onto the container 10 by turning the lid 22 when the tabs 24 are lined up with the horizontal grooves 28 such that the tabs 24 slide over the detents 30 and into the horizontal grooves 28, thereby preventing the lid 22 from traveling back through the vertical grooves 26. The horizontal grooves 28 are further defined along a length of the vertical groove 26. This allows the lid 22 to be inserted onto the container 10 for varying an amount of space in the container 10, depending on an amount of wood chips or chunks 2 in the container 10. Thus, when the container 10 is submersed in water, the wood chips or chunks 2 are prevented from floating within the container 10.

As illustrated in FIGS. 2 to 6, to use the container 10, wood chips or chunks 2 are placed into the container 10. The lid 22 is inserted into the vertical grooves 26 in the container 10. The lid 22 is twisted clockwise to slide the tabs 24 into the horizontal grooves 28. The lid 22 is locked in place by snapping the tabs 24 over the detentes 30. The container 10 is then placed into water 3, which can be a tub of water, a river, a take, or any other body of water in which the container 10 can be submersed. The container 10 is allowed to remain in the water 3 for a sufficient amount of soaking time, generally in excess of 30 minutes, and at times about 2 hours. When the soaking is complete, the container 10 is retrieved from the water and drained by placing the container 10 on a flat surface. The legs 16 allow the water within the container 10 to flow out of the holes 12 in the bottom surface 18 of the container 10. After draining, the top of the container 10 is removed and the wood chips or chunks 2 are shaken onto the grill 1 to convert it into a smoker.

Figure 7:
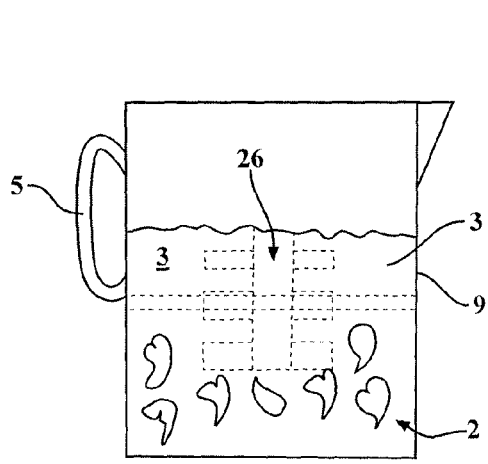
FIG. 7 is a side view of another embodiment of the container.
Figure 8:
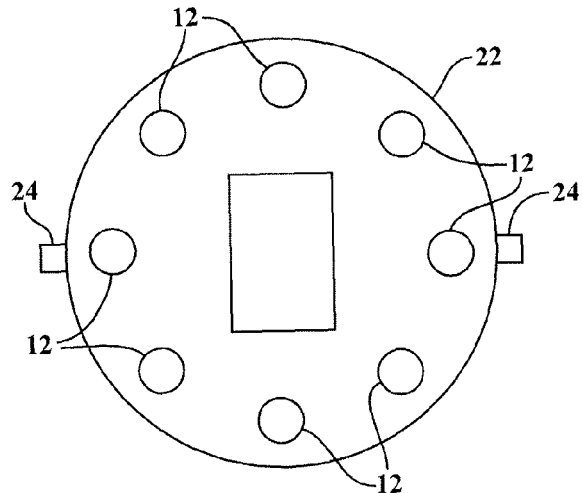
FIG. 8 is a top view of the lid having holes for use with the container of FIG. 7.

In another embodiment, as shown in FIGS. 7 and 8, the container 10 is a cylindrical container having modified inner walls. The lid 22 is perforated and interfaces with the modifications to inner walls in such a manner as to be able to lock the lid 22 in a position some place between the bottom surface 18 and the top of the container. Thus designed, the container 10 could be loaded with the wood chips or chunks 2, the lid 22 could be applied and the container 10 could be filled with liquid, e.g., water. After the wood chips or chunks 2 have soaked for the appropriate amount of time, the liquid in the container 10 could be poured off and the container 10 could be inverted so as to complete the draining process. This design would allow for the easy modification of existing cylindrical containers to accommodate the lid 22, thereby providing an effective means of keeping buoyant items, i.e., wood chips or chunks 2, foods to be reconstituted such as Shitake mushrooms, etc., submerged in liquid. The lid 22 having holes 12 would also allow the container 10 to be used just for its draining capacity, i.e., items to be drained could be placed in the bottom of the container 10, the lid 22 installed on the container 10, and the container 10 turned upside down and left to stand on its top to complete the draining process. This design also would allow a manufacturer to provide a container product with two lids: one standard lid used to protect the contents of the container 10 and prevent spilling, and one lid 22 with holes 12 to perform the aforementioned functions.

Referring to FIGS. 9-10 and 15-16, an alternate embodiment of the container 10 is illustrated. The container 10 has internal threads 40 securing the lid 22 thereto. The threads 40 may extend over the entire surface of the container 10 or only a portion thereof. The threads 40 will engage the lid 22 similarly as for the embodiment described above for the lid 22 having tabs.

An alternate embodiment of the lid 22 is shown in FIGS. 11 through 14. The lid 22 has a lip 42 for engaging the threads 40 of the container 10. The lip 42 may be threaded or may be received by the threads 40 of the container directly. Alternatively, the lip 42 may directly engage the threads 40 for securing thereto. The lid 22 may be screwed onto the container 10 at various depths depending upon the amount of wood chips or chunks in the container. When the threads 40 are on the inside of the container 10, the lid 22 can be screwed down into contact with the woodchips.

Figure 11:
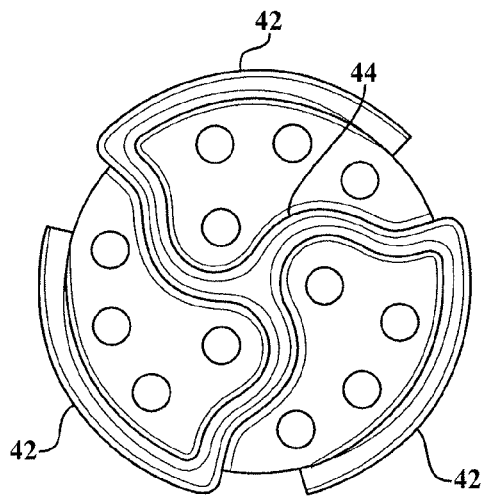
FIG. 11 is a prospective view of another embodiment of the lid for threadably engaging the container of FIG. 9.
Figure 12:
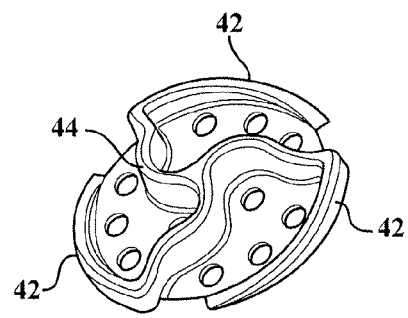
FIG. 12 is a top view of the lid shown in FIG. 11.
Figure 13:
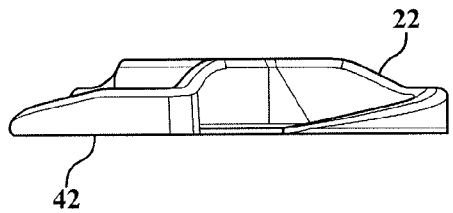
FIG. 13 is a side view of the lid shown in FIG. 11.
Figure 14:
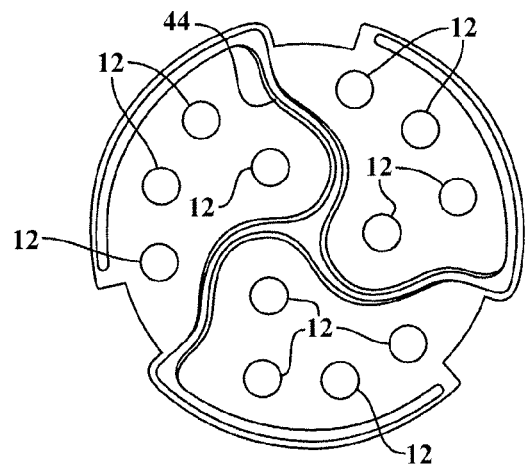
FIG. 14 is a bottom view of the lid shown in FIG. 11.
Figure 15:
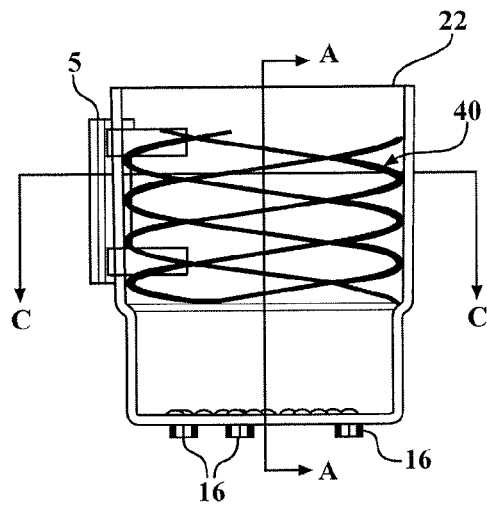
FIG. 15 is a side elevational view of the container of FIG. 9 having internal threads in phantom lines with the lid mounted to the container.
Figure 16:
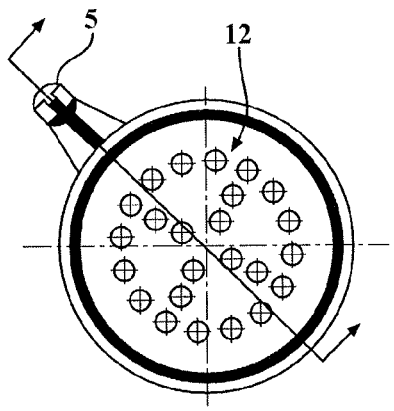
FIG. 16 is a top view of the assembly shown in FIG. 15.
Figure 17:
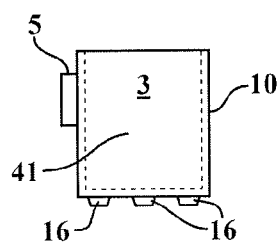
FIG. 17 is a front view of the container of an alternative embodiment
Figure 18:
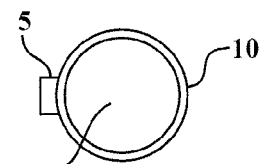
FIG. 18 is a top view of the container of FIG. 17

The lid 22, as best shown in FIG. 11, has grips 44 for ease of screwing the lid 22 onto the container 10. The container 10 shown in this embodiment does not include the pour spout.

Figure 19:
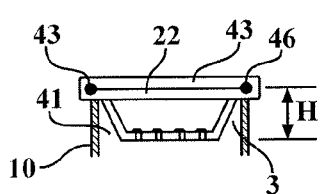
FIG. 19 is a front view of the lid of FIG. 17
Figure 20:
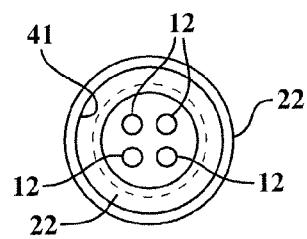
FIG. 20 is a top view of the lid of FIG. 17
Figure 20A:
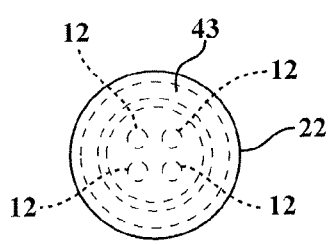
FIG. 20a is a top view of the container of FIG. 17 including the pressure fit or friction fit sealing cap.
Figure 21:
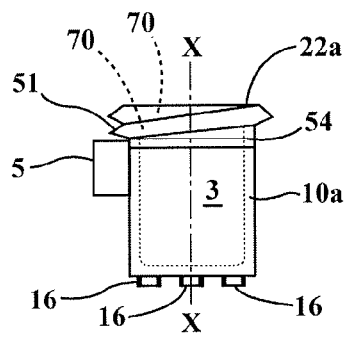
FIG. 21 is a front view of the container of another embodiment with external grooves on the container.
Figure 22:
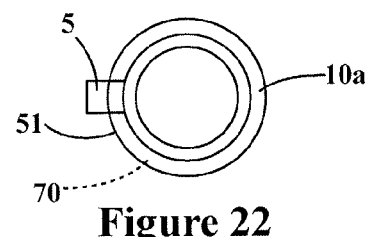
FIG. 22 is a top view of the container of FIG. 21

Referring to FIGS. 17 to 20 and 20a, an alternate embodiment of the lid 22 engaging with the container 10 using a pressure fit or friction fit edge to engage the lid 22 onto the container 10. In addition, the lid 22 has a lip 46 to engage a pressure fit or friction fit cap 43 to engage with the lid 22. The lid 22 has a lip 46 to engage with the container 10, and also provides for the interactive pressure fit or friction fit engagement of the pressure fit or friction fit cap 43, as shown in FIGS. 19 and 20a. The pressure fit or friction fit cap 43 seals the container 10 to avoid spilling the water 3 if the container 10 is accidentally knocked over during the soaking of the wood chips or chunks 2. FIG. 20 illustrates the container 10 and lid 22 with the cap 43 removed.

As shown in FIG. 19, the lid 22 has a height H to keep the soaking wood chips or chunks 2 in the soaking material. The height H of the lid 22 extends into the container 10 by that depth to keep the wood chips or chunks submersed in the water of fluid medium 3 disposed in the interior 41 of the container 10. In order to facilitate the draining of the water 3, from the wood chips or chunks 2, holes 12 are placed in the lid 22 to allow for the water 3 to be easily drained. However, one skilled in the art could envision alternative functionally equivalent lid 22 designs, such as the addition of a handle, to the above-described embodiment.

Referring to FIGS. 21 to 24, an additional alternate embodiment of the container 10a and lid 22a by the use of a screw-on and locking mechanism to engage and secure the lid 22a to the container 10a. The lid 22a has a lip 51 that engages threads 70 oil the exterior of the container 10a to create a secure engagement. To better secure the lid 22a to the container 10a and hold the lid 22a tightly in place, the lid 22a may have locking extensions 52, which may be of the flip-down variety or made of material that has a spring back effect to hold securely against the container 10a to keep the lid 22a from moving either rotationally around or along the axis X-X of the container 10a. The locking extensions 52 engage the container 10a at a continuous groove 54 or at a series of peripherally spaced apart indentations disposed on the external surface of the container 10a. In order to secure the locking extensions 52 with the continuous groove 54, the lid 22a must be rotated by a handle 50 that is incorporated into the lid 22a to a level where the extensions 52 would interact with the groove 54 or equivalent structure.

A press fit or friction fit cap may also be used to engage over the lid 22a to seal the contents of the container 10a within the container 10a, as discussed in the prior embodiment. The pressure fit or friction fit cap in engagement with the lid 22a would then seal the container 10a and lid 22a to avoid spilling the fluid or water 3 and the wood chips or chunks 2 if accidentally knocked over during the soaking.

Figure 23:
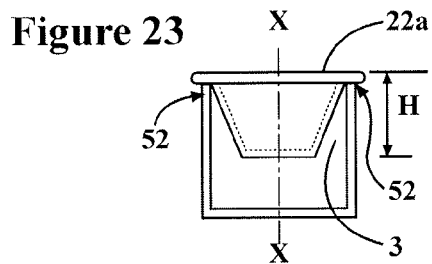
FIG. 23 is a front view of the container of FIG. 21 having a lid with locking extensions
Figure 24:
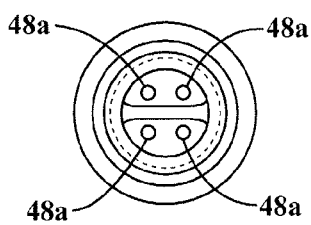
FIG. 24 is a top view of the lid with locking extensions of FIG. 23

The above alternate embodiment also incorporates several holes 48a to facilitate the draining of the soaking fluid or water 3 as shown in FIG. 24. Also, the lid 22a has a height H that enters into the container 10a to a sufficient depth to maintain the wood chips or chunks 2 submersed below the top surface of the soaking fluid or water 3 as shown in FIG. 23.

To use the container 10 and lid 22 of FIGS. 7-24, wood chips and/or chunks are placed in the container 10 and then the lid 22 is secured to the container 10 at the appropriate level. The soaking fluid is then added to the container 10 through the holes 12 in the lid 22 so as to completely submerge the wood chips or chunks 2. After the soaking process is complete, the container 10 is tilted so as to allow the controlled draining of the soaking fluid from the container 10. The container 10 is then inverted for a period of time to allow for the continued draining of the wood chips or chunks 2. After the draining process, the lid 22 is removed from the container 10 and the wood chips or chunks 2 are scattered onto the hot coals of a charcoal fire or added to a smoker box to be then used on a gas grill.

Figure 25:
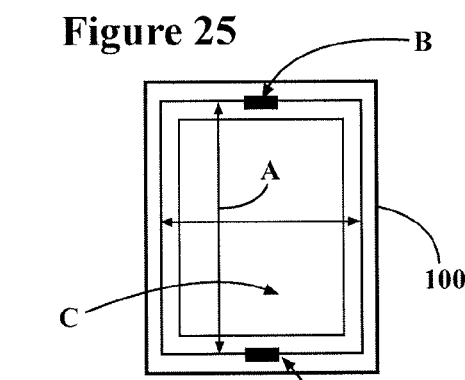
FIG. 25 is a top view of an additional container embodiment.
Figure 26:
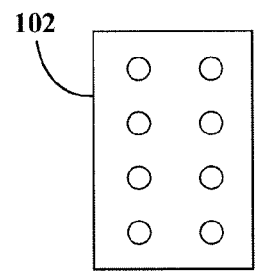
FIG. 26 is a top view of a lid that is used with the container of FIG. 25.
Figure 27:
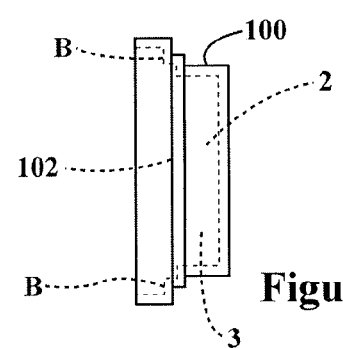
FIG. 27 is a side elevational view of the lid of FIG. 28.

Referring to FIGS. 25 to 27, a further additional embodiment of the invention is illustrated which can be used for soaking and draining wood chips or chunks 2 as well as for placement on the grill as a smoker box (assuming the appropriate materials were used in its construction, such as aluminum or similar heat resistant material).

Wood chips or chunks 2 would be placed in the container 100 in the area noted by C. The lid 102 would be placed on the container 100 in the area noted as A and latched to the container 100 at the areas noted as B. The latching mechanism can be such that the lid 102 is not permanently connected to the container 100 or it can be permanently connected via a hinge at one of the B areas with a suitable latch at another B area. Other alternative equivalent latching configurations have been expressed above.

In use, the container 100 would be filled with wood chips or chunks 2 and the lid 102 would be secured to the container 100. Soaking liquid would be poured into the container 100 until the wood chips or chunks were submerged. After the soaking period, the container 100 would be tipped so as to drain the soaking liquid. After draining, the lid 102 could be removed from the container 100 and the soaked wood or soaked chunks scattered onto the hot coals of a charcoal grill or placed in a separate smoker box and placed in the appropriate spot on a gas grill. If the appropriate material were used, after draining, the container 100 could be placed directly onto the hot coals of a charcoal grill or onto an appropriate spot on a gas grill.

The container 100 as shown is rectangular in form. It could also be designed such that the bottom portion of the container 100, i.e., the portion that would come in direct contact with the heating elements of a gas grill, would be customized to fit the particular grill being used. For example, the unit could be configured to fit onto the Flavorizer Bars in a Weber gas grill.

Alternately, the lid 102 may be made of many materials and one skilled in the art would understand from the above disclosure wholly of plastic, a combination of plastic and a mesh type material, i.e. wire mesh, etc. or a variety of other materials that in total provide for the functions of submerging the wood chips or chunks under the soaking liquid, allow for the easy addition/draining of the soaking liquid and for the addition of a pressure fit or friction fit cap to prevent the accidental spillage of the soaking liquid or water 3.

From a packaging standpoint, the container 10, 10a, 100 is intended to have a two piece decal attached to the top surface of the lid 22, 22a, 102. One of the decals would have the product name, smoking tips, and favorite recipes. The other decal would have a graphic on how to use the container 10 under the banner "Makes Using Wood chips or chunks As Easy As 1, 2, 3 & 4".

It is also envisioned that the container 10, 10a, 100 and lid 22, 22a, 102 assembly could be placed on the retail shelf with a Wood Chip Sampler. The Wood Chip Sampler would have small packages of mesquite, hickory and apple wood chips or chunks all stacked and packaged in a clear cellophane package, cylindrical in shape and capable of being placed in the container 10, 10a, 100 for retail display.

Figure 28:
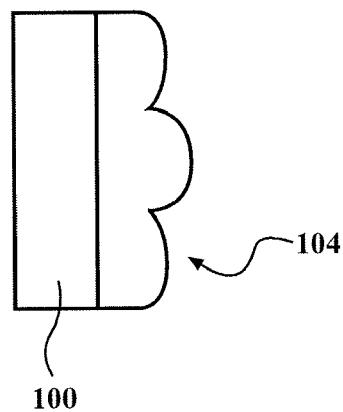
FIG. 28 is a side view of a bonnet for use with a container, according to an embodiment of the present invention.
Figure 29:
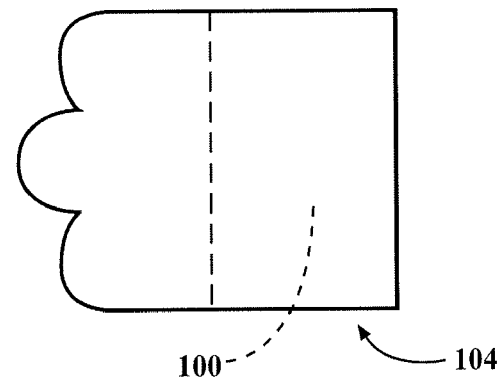
FIG. 29 is a top view of the bonnet of FIG. 28.
Figure 30:
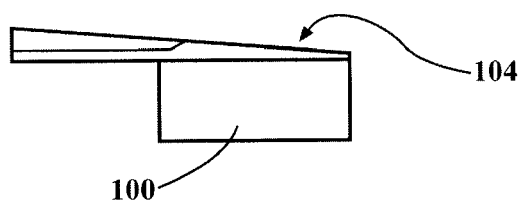
FIG. 30 is a front view of the bonnet of FIG. 28.

With reference to FIGS. 28-30, a bonnet 104 could be placed on top of the container 100 after the wood chips or chunks 2 had been soaked and drained, and prior to the item being placed on the grill for use as a Smoker Box. The function of the bonnet 104 is to direct the smoke generated in the container 100 to the center of the grill such that a more uniform degree of smoke flavor would be imparted to the food as it was heated. This embodiment would be especially useful on a gas grill where the current designs limit the uniform distribution of smoke flavor when using conventional smoker boxes.

Figure 31:
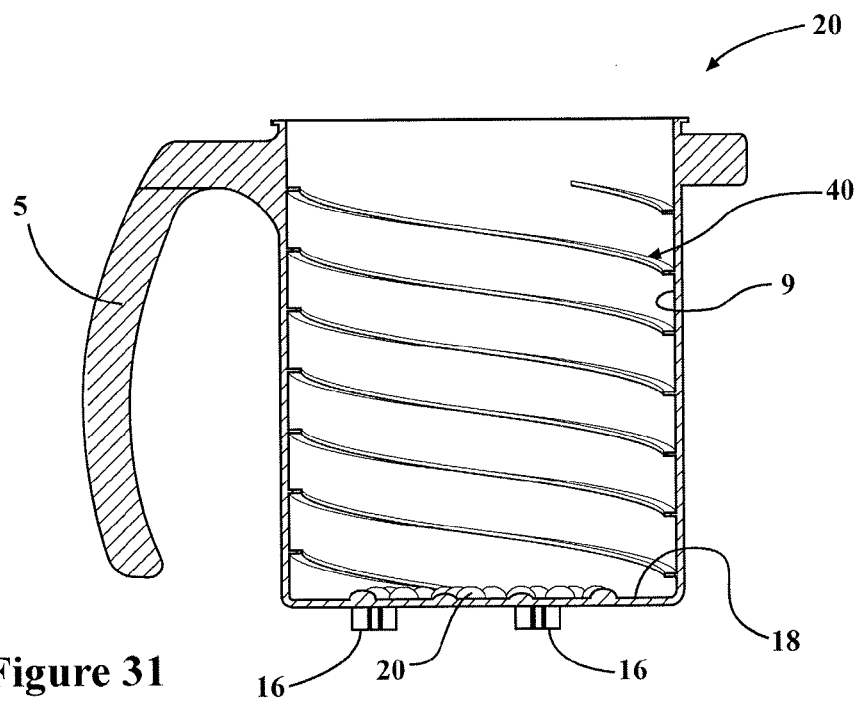
FIG. 31 is a side view of an additional container embodiment.
Figure 32:
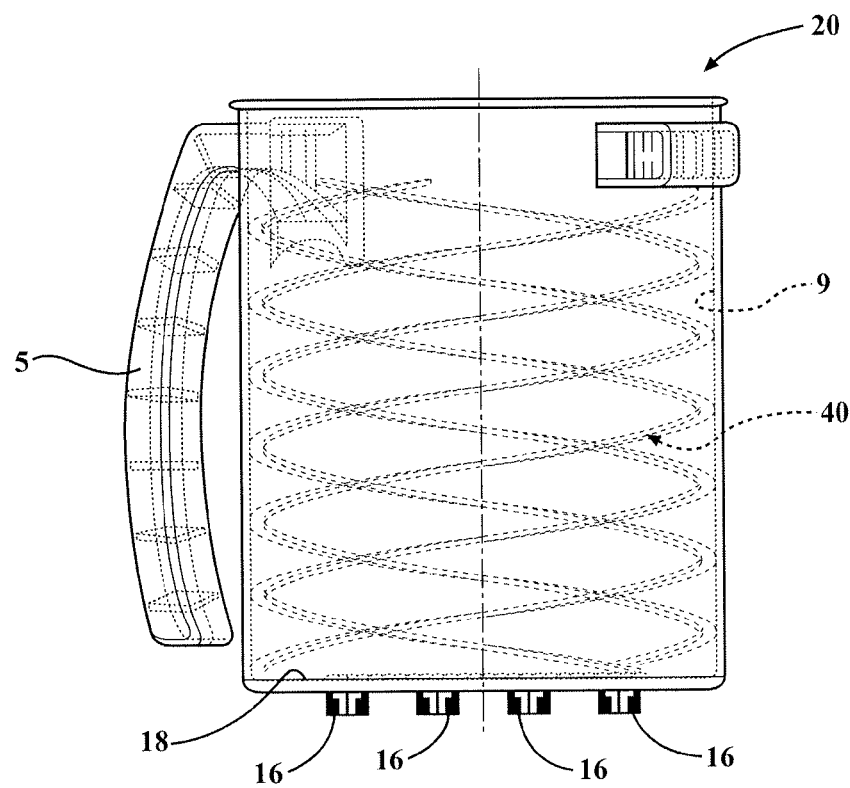
FIG. 32 is a perspective view of the additional container embodiment.

Referring to FIGS. 31 and 32, a second additional embodiment of the container 20 for soaking of wood chips or chunks. The container 20 utilizes the lid 22 as shown in FIG. 11 and the lid 22 engages the threads 40 of the container. The threads 40 fully extend from the top of the container 10 to the bottom surface 18. The lid 22 engages into the threads 40 and the lid 22 is thereby adjusted within the threads 40 to maintain the wood chips or chunks fully submerged under the liquid in the container 20. The second embodiment is particularly advantageous as to provide infinite variability to a height between the lid 22 and the bottom surface 18 of the container 10. The variability of the positioning of the lid 22 allows for any amount of wood chips or chunks to be soaked within the container 10.

Many modifications and variations of the present invention are believed to be possible in light of the above teachings.

What is being claimed is:

1. An apparatus for soaking wood chips or chunks in a liquid and draining the liquid from the wood chips or chunks, comprising:
   a container including a bottom and a sidewall extending from said bottom to define an opening therein for retaining the liquid while the wood chips or chunks are soaking;
   said sidewall having an outer surface and an inner surface opposing said outer surface with said inner surface of said sidewall defining threads;
   a lid defining a plurality of apertures spaced from each other with said lid having an outer periphery complimentary to said opening such that said lid is configured to be disposed in said opening to engage said threads of said inner surface for positioning said lid a distance from said bottom;
   a plurality of lips extending from said lid adjacent said outer periphery and spaced from each other for engaging said threads of said inner surface; and
   a grip extending upwardly from said lid and spaced from said apertures for moving said lid relative to said container.

2. An apparatus as set forth in claim 1 wherein said grip includes a first arm extending toward one of said lips.

3. An apparatus as set forth in claim 2 wherein said grip further includes a second arm adjacent said first arm and extending toward another one of said lips.

4. An apparatus as set forth in claim 3 wherein said grip further includes a third arm adjacent said first and second arms and extending toward yet another one of said lips.

5. An apparatus as set forth in claim 4 wherein said first, second, and third arms each define an arcuate configuration for gripping said lid.

6. An apparatus as set forth in claim 4 wherein said lid defines a center spaced from said outer periphery with said first, second, and third arms abutting each other at said center of said lid.

7. An apparatus as set forth in claim 4 wherein said first, second, and third arms are spaced from said apertures.

8. An apparatus as set forth in claim 6 wherein said first, second, and third arms extend from said center of said lid to respective lips such that said first, second, and third arms abut respective lips.

9. An apparatus as set forth in claim 4 wherein said lips are spaced from each other to define a gap between said lips adjacent said outer periphery for receiving said threads of said inner surface.

10. An apparatus as set forth in claim 9 wherein each of said lips include a ramp sloping upwardly toward respective arms for engaging said threads of said inner surface.

11. An apparatus as set forth in claim 1 wherein each of said lips include a ramp sloping upwardly toward said grip for engaging said threads of said inner surface.

12. An apparatus as set forth in claim 1 further including a handle coupled to said outer surface of said sidewall.

13. An apparatus as set forth in claim 1 further including a plurality of legs extending from said bottom of said container away from said sidewall for supporting said container.

* * * * *